United States Patent
Matsumoto et al.

(10) Patent No.: US 11,376,681 B2
(45) Date of Patent: Jul. 5, 2022

(54) ELECTROMECHANICAL MACHINING METHOD, METHOD OF MANUFACTURING PERFORATED MATERIAL, PROCESSING ELECTRODE, AND ELECTROMECHANICAL MACHINING SYSTEM

(71) Applicant: Mitsubishi Hitachi Power Systems, Ltd., Yokohama (JP)

(72) Inventors: Kota Matsumoto, Yokohama (JP); Masako Idota, Yokohama (JP); Takuro Hashimoto, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 253 days.

(21) Appl. No.: 16/618,955

(22) PCT Filed: Jul. 2, 2018

(86) PCT No.: PCT/JP2018/025019
§ 371 (c)(1),
(2) Date: Dec. 3, 2019

(87) PCT Pub. No.: WO2019/017191
PCT Pub. Date: Jan. 24, 2019

(65) Prior Publication Data
US 2020/0086410 A1    Mar. 19, 2020

(30) Foreign Application Priority Data
Jul. 18, 2017 (JP) .............................. JP2017-138772

(51) Int. Cl.
*B23H 9/14* (2006.01)
*B23H 3/04* (2006.01)
(Continued)

(52) U.S. Cl.
CPC ................. *B23H 9/14* (2013.01); *B23H 3/04* (2013.01); *B23H 3/08* (2013.01); *B23H 3/10* (2013.01); *F05D 2230/11* (2013.01)

(58) Field of Classification Search
CPC ............... B23H 3/04; B23H 3/10; B23H 9/14
See application file for complete search history.

(56) References Cited

U.S. PATENT DOCUMENTS 8,663,450 B1 * 3/2014 Kathe ...................... B23H 9/14
                                                                 205/686
9,878,388 B2    1/2018 Mukai et al.
(Continued)

FOREIGN PATENT DOCUMENTS

CN    103781581    5/2014
CN    104755215    7/2015
(Continued)

OTHER PUBLICATIONS

Office Action dated May 14, 2020 in Chinese Patent Application 201880036168.4, with English-language translation.
(Continued)

*Primary Examiner* — Nicholas A Smith
(74) *Attorney, Agent, or Firm* — Wenderoth, Lind & Ponack, L.L.P.

(57) ABSTRACT

A method of forming a curved-shaped processing hole in a workpiece by electromechanical machining includes a step of feeding an electrolytic solution through an inner channel of a processing electrode and jetting the electrolytic solution from an outlet opening of the inner channel disposed on a tip surface of the processing electrode, a step of applying a potential difference between the processing electrode and the workpiece while jetting the electrolytic solution from the outlet opening of the processing electrode, and a step of forming the curved-shaped processing hole in the workpiece. In the jetting step, at least one of a current density (Continued)

distribution on the tip surface of the processing electrode or a flow velocity distribution of the electrolytic solution jetted from the outlet opening is eccentric to a downstream side of a curving direction of the processing hole with respect to an axial center of the tip surface.

14 Claims, 10 Drawing Sheets

(51) Int. Cl.
  *B23H 3/08* (2006.01)
  *B23H 3/10* (2006.01)

(56) References Cited

U.S. PATENT DOCUMENTS

2015/0231717 A1  8/2015  Tamura et al.
2015/0273602 A1  10/2015  Mukai et al.

FOREIGN PATENT DOCUMENTS

| JP | 2013-136140 | 7/2013 |
| JP | 2013-180389 | 9/2013 |
| JP | 5955207 | 7/2016 |
| JP | 2016-187850 | 11/2016 |
| KR | 10-2014-0043499 | 4/2014 |

OTHER PUBLICATIONS

Office Action dated May 15, 2021 in corresponding KR Application No. 10-2019-7035176 with Machine translation.
International Search Report dated Sep. 4, 2018 in International (PCT) Application No. PCT/JP202018/025019.
International Preliminary Report on Patentability and Written Opinion of the International Searching Authority dated Jan. 30, 2020 in International (PCT) Application No. PCT/JP2018/025019 with English translation.

* cited by examiner

Curving direction →

ELECTROMECHANICAL MACHINING METHOD, METHOD OF MANUFACTURING PERFORATED MATERIAL, PROCESSING ELECTRODE, AND ELECTROMECHANICAL MACHINING SYSTEM

TECHNICAL FIELD

The present disclosure relates to an electromechanical machining method of forming a curved-shaped processing hole in a workpiece by electromechanical machining, a perforated material manufacturing method of forming a processing hole by the method, a processing electrode used for electromechanical machining, and an electromechanical machining system comprising the processing electrode.

BACKGROUND

A boring process for a difficult-to-machine material is generally performed by an electromechanical machining method or electric spark forming. In particular, the electromechanical machining method may be used when the boring process is performed for a difficult-to-machine material having a high aspect ratio. For example, in a gas turbine rotor blade of a gas turbine, a cooling hole for feeding a refrigerant to cool the gas turbine rotor blade is formed. In order to increase cooling efficiency of the cooling hole, it may be desirable to curve the shape of the cooling hole along a geometrical shape of the gas turbine rotor blade.

An electrode of an electromechanical machining tool disclosed by Patent Document 1 includes a flexible fluid lead-out portion on the side surface of a body thereof. The fluid lead-out portion leads out an electrolytic solution radially outward. The electrode is curved on a side opposite to a lead-out direction of the electrolytic solution by utilizing reaction when the electrolytic solution is led out of the fluid lead-out portion, making it possible to change a moving direction of the electrode and to form a curved hole having a desired curvature.

CITATION LIST

Patent Literature

Patent Document 1: JP5955207B

SUMMARY

Technical Problem

However, in a method of Patent Document 1, the fluid lead-out portion needs to be provided for the electrode of the electromechanical machining tool, complicating the configuration of the electrode.

In view of the above issues, an object of at least one embodiment of the present invention is to provide an electromechanical machining method, a method of manufacturing a perforated material, a processing electrode, and an electromechanical machining system capable of easily forming a curved hole while avoiding complicating the configuration of the electrode.

Solution to Problem (1) An electromechanical machining method according to at least one embodiment of the present invention is an electromechanical machining method of forming a curved-shaped processing hole in a workpiece by electromechanical machining, the method including a step of feeding an electrolytic solution through an inner channel of a processing electrode and jetting the electrolytic solution from an outlet opening of the inner channel disposed on a tip surface of the processing electrode, a step of applying a potential difference between the processing electrode and the workpiece while jetting the electrolytic solution from the outlet opening of the processing electrode, and a step of forming the curved-shaped processing hole in the workpiece.

In the step of jetting the electrolytic solution, at least one of a current density distribution on the tip surface of the processing electrode or a flow velocity distribution of the electrolytic solution jetted from the outlet opening is eccentric to a downstream side of a curving direction of the processing hole with respect to an axial center of the tip surface of the processing electrode.

As a result of intensive researches by the present inventors, it becomes clear that the curved-shaped processing hole can be formed by making at least one of the current density distribution on the tip surface of the processing electrode or the flow velocity distribution of the electrolytic solution eccentric with respect to the axial center of the electrode tip surface.

The above method (1) is based on the above findings of the present inventors, and the curved-shaped processing hole curves toward the above-described eccentric direction even without providing, for example, a fluid lead-out portion or the like in the processing electrode. The workpiece is processed more deeply on an inner surface positioned on the downstream side of the curving direction of the processing hole than on an inner surface positioned on the upstream side of the curving direction. Thus, an interval between the inner surface and the tip surface of the processing electrode increases, and the solution pressure of the electrolytic solution flowing through the interval decreases. The processing electrode is prompted such that the tip part thereof is curved, due to the solution pressure of the electrolytic solution flowing around, to the above-described side where the solution pressure of the electrolytic solution decreases, and processes the workpiece in the above-described eccentric direction. Therefore, with the above method, it is possible to easily form the curved hole while avoiding complicating the configuration of the electrode.

(2) In some embodiments, in the above method (1), a centroid of a region of the tip surface excluding the outlet opening is eccentric with respect to the axial center of the tip surface, and the processing hole is formed with a curve in a direction in which the centroid of the region deviates with respect to the axial center.

With the above method (2), since it is possible to make the current density distribution of the processing electrode eccentric in the direction in which the centroid of the region excluding the outlet opening deviates with respect to the axial center, it is possible to form the processing hole with the curve in the direction in which the centroid of the region deviates.

(3) In some embodiments, in the above method (2), the inner channel is partially clogged with a conductive material on the tip surface, and thus the centroid of the region of the tip surface excluding the outlet opening is eccentric with respect to the axial center.

With the above method (3), a current flows through the conductive material by partially clogging the inner channel with the conductive material on the tip surface even if the centroid of the region excluding the outlet opening is not eccentric with respect to the axial center before the inner channel is partially clogged. Thus, it is possible to make the centroid of the region eccentric with respect to the axial center. Therefore, it is possible to make the current density distribution of the processing electrode eccentric in the direction in which the centroid of the region deviates with respect to the axial center, and thus to form the processing hole with a curve in the direction in which the centroid of the region deviates.

(4) In some embodiments, in any one of the above methods (1) to (3), a centroid of the outlet opening is eccentric with respect to the axial center of the tip surface, and the processing hole is formed with a curve in a direction in which the centroid of the outlet opening deviates with respect to the axial center.

With the above method (4), since it is possible to make the flow velocity distribution of the electrolytic solution jetted from the outlet opening eccentric in the direction in which the centroid of the outlet opening deviates with respect to the axial center, it is possible to form the processing hole with the curve in the direction in which the centroid of the outlet opening deviates.

(5) In some embodiments, in the above method (4), the inner channel is partially clogged, and thus the centroid of the outlet opening is eccentric with respect to the axial center.

With the above method (5), it is possible to make the centroid of the outlet opening eccentric with respect to the axial center by partially clogging the inner channel even if the centroid of the outlet opening is not eccentric with respect to the axial center before the inner channel is partially clogged. Therefore, it is possible to make the flow velocity distribution of the electrolytic solution jetted from the outlet opening eccentric in the direction in which the centroid of the outlet opening deviates with respect to the axial center, and thus to form the processing hole with a curve in the direction in which the centroid of the outlet opening deviates.

(6) In some embodiments, in any one of the above methods (1) to (5), the inner channel is divided into a plurality of inner channels by a partition portion, and at least one of the plurality of divided inner channels is clogged.

With the above method (6), it is possible to easily make the current density distribution on the tip surface of the processing electrode and the flow velocity distribution of the electrolytic solution jetted form the outlet opening eccentric to the downstream side of the curving direction of the processing hole with respect to the axial center of the tip surface of the processing electrode by clogging at least one of the plurality of inner channels divided by the partition portion.

(7) In some embodiments, in any one of the above methods (1) to (6), a centroid of the inner channel is eccentric with respect to an axial center of the processing electrode in a cross section orthogonal to an axial direction of the processing electrode.

With the above method (7), since the centroid of the inner channel is eccentric with respect to the axial center of the processing electrode in the cross section orthogonal to the axial direction of the processing electrode, the flow velocity distribution of the electrolytic solution on the tip surface is eccentric in a direction in which the centroid of the inner channel deviates with respect to the axial center of the processing electrode. Thus, it is possible to form the processing hole with a curve in the direction in which the centroid of the inner channel deviates.

(8) In some embodiments, in any one of the above methods (1) to (7), at a tip of the processing electrode, a tapered surface is formed at least partially in a circumferential direction, the tapered surface having an external dimension decreasing toward the tip.

With the above method (8), the electrolytic solution flowing in the vicinity of a portion where the tapered surface is formed easily flows into between the outer periphery of an electrical insulation layer and the inner surface of the processing hole, making it possible to prevent a decrease in efficiency of electromechanical machining.

(9) In some embodiments, in any one of the above methods (1) to (8), the electrolytic solution contains nitric acid or sodium nitrate.

With the above method (9), since the electrolytic solution contains acid or sodium nitrate having a high electromechanical machining capability, it is possible to improve efficiency of electromechanical machining.

(10) A method of manufacturing a perforated material according to at least one embodiment of the present invention includes a step of forming the processing hole in the workpiece by the method according to any one of the above methods (1) to (9) and manufacturing the perforated material.

With the above method (10), since it is possible to easily form the processing hole while avoiding complicating the configuration of the electrode by the above-described method, it is possible to easily manufacture the perforated material having the processing hole.

(11) In some embodiments, in the above method (10), the perforated material is a gas turbine rotor blade having a curved-shaped cooling hole as the processing hole.

With the above method (11), it is possible to, for example, curve the curved shape of the processing hole (cooling hole) along a geometrical shape of the gas turbine rotor blade.

(12) A processing electrode according to at least one embodiment of the present invention is a processing electrode for forming a curved-shaped processing hole in a workpiece by electromechanical machining, the processing electrode including an inner channel configured to be able to feed an electrolytic solution in an axial direction of the processing electrode, and a tip surface where an outlet opening of the inner channel for jetting the electrolytic solution is formed.

At least one of a centroid of a region of the tip surface excluding the outlet opening or a centroid of the outlet opening is eccentric with respect to an axial center of the tip surface.

The above configuration (12) is based on the above findings of the present inventors, and the processing electrode can form the curved-shaped processing hole curving toward the above-described eccentric direction even without, for example, the fluid lead-out portion or the like. Therefore, with the above-described structure, it is possible to easily form the curved hole while avoiding complicating the configuration of the electrode.

(13) An electromechanical machining system according to at least one embodiment of the present invention includes the processing electrode according to the above configuration (12).

The electromechanical machining system is configured to be able to form the processing hole in the workpiece by electromechanical machining using the processing electrode.

As described above, the processing electrode according to the above configuration (12) can form the curved-shaped processing hole curving toward the above-described eccentric direction even without, for example, the fluid lead-out portion or the like. Therefore, with the above structure (13), it is possible to easily form the curved hole while avoiding complicating the configuration of the electrode.

(14) In some embodiments, in the above structure (13), the electromechanical machining system further includes an electrolytic solution supply amount adjustment device configured to be able to adjust a supply amount of the electrolytic solution to each of a plurality of inner channels formed in the processing electrode.

With the above structure (14), since the flow velocity distribution of the electrolytic solution jetted from the outlet opening is eccentric along with an eccentricity of the flow velocity distribution of the electrolytic solution passing through the inner channel by the electrolytic solution supply amount adjustment device, it is possible to form the processing hole with a curve in a direction in which the flow velocity distribution of the electrolytic solution passing through the inner channel is eccentric.

Advantageous Effects

According to at least one embodiment of the present invention, an electromechanical machining method, a method of manufacturing a perforated material, a processing electrode, and an electromechanical machining system are provided, which are capable of easily forming a curved hole while avoiding complicating the configuration of the electrode.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
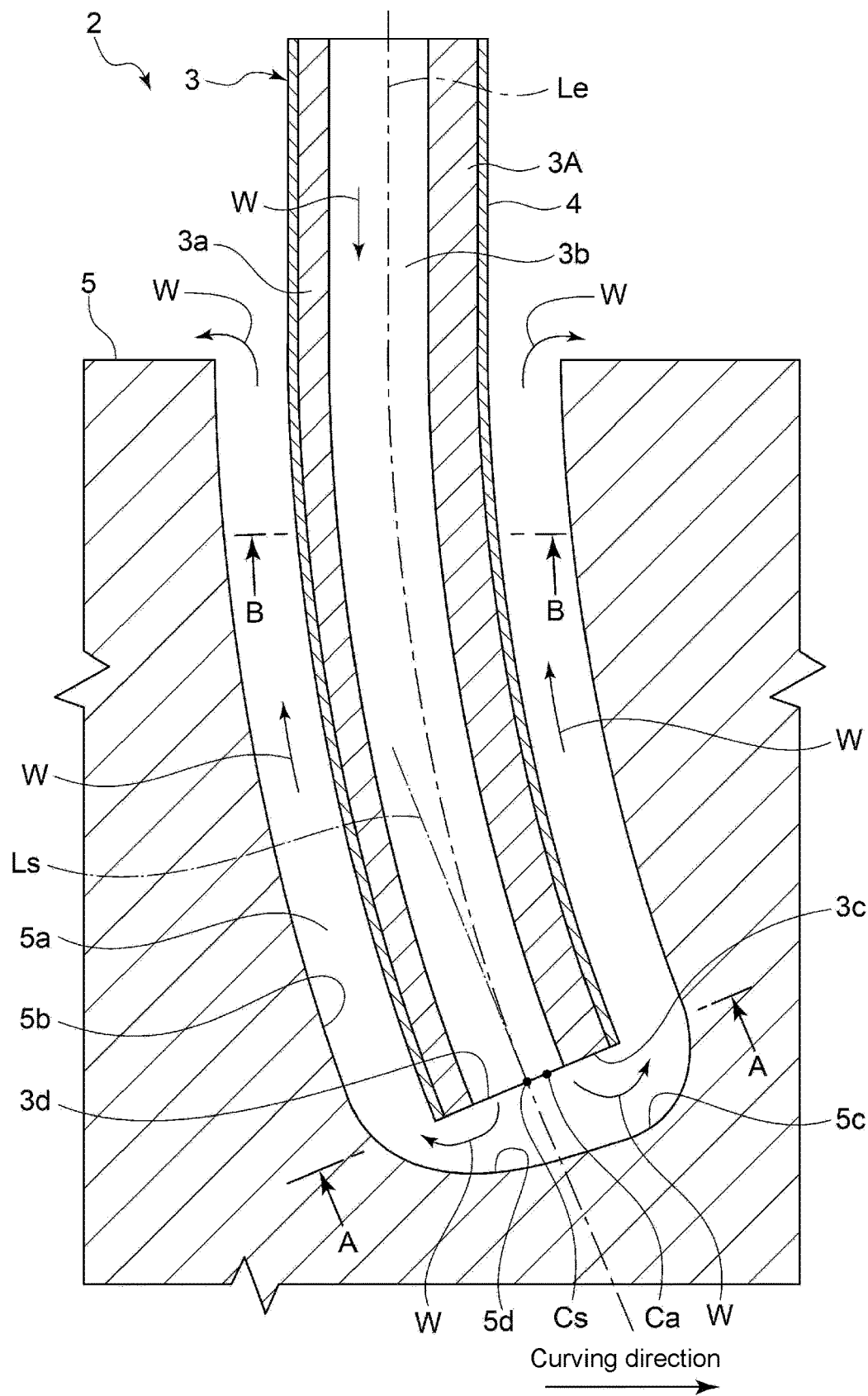
FIG. 1 is a vertical cross-sectional view schematically showing a processing electrode together with a workpiece according to an embodiment of the present invention.
Figure 2:
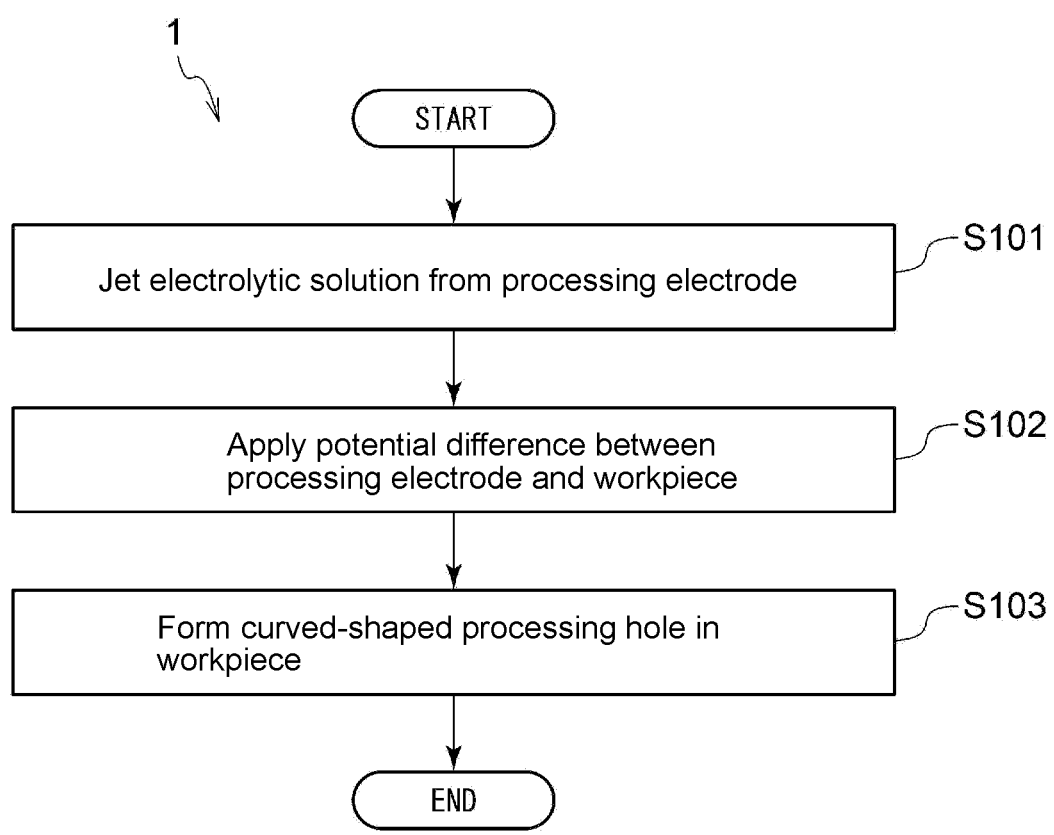
FIG. 2 is a flowchart for describing an electromechanical machining method according to an embodiment of the present invention.
Figure 3:
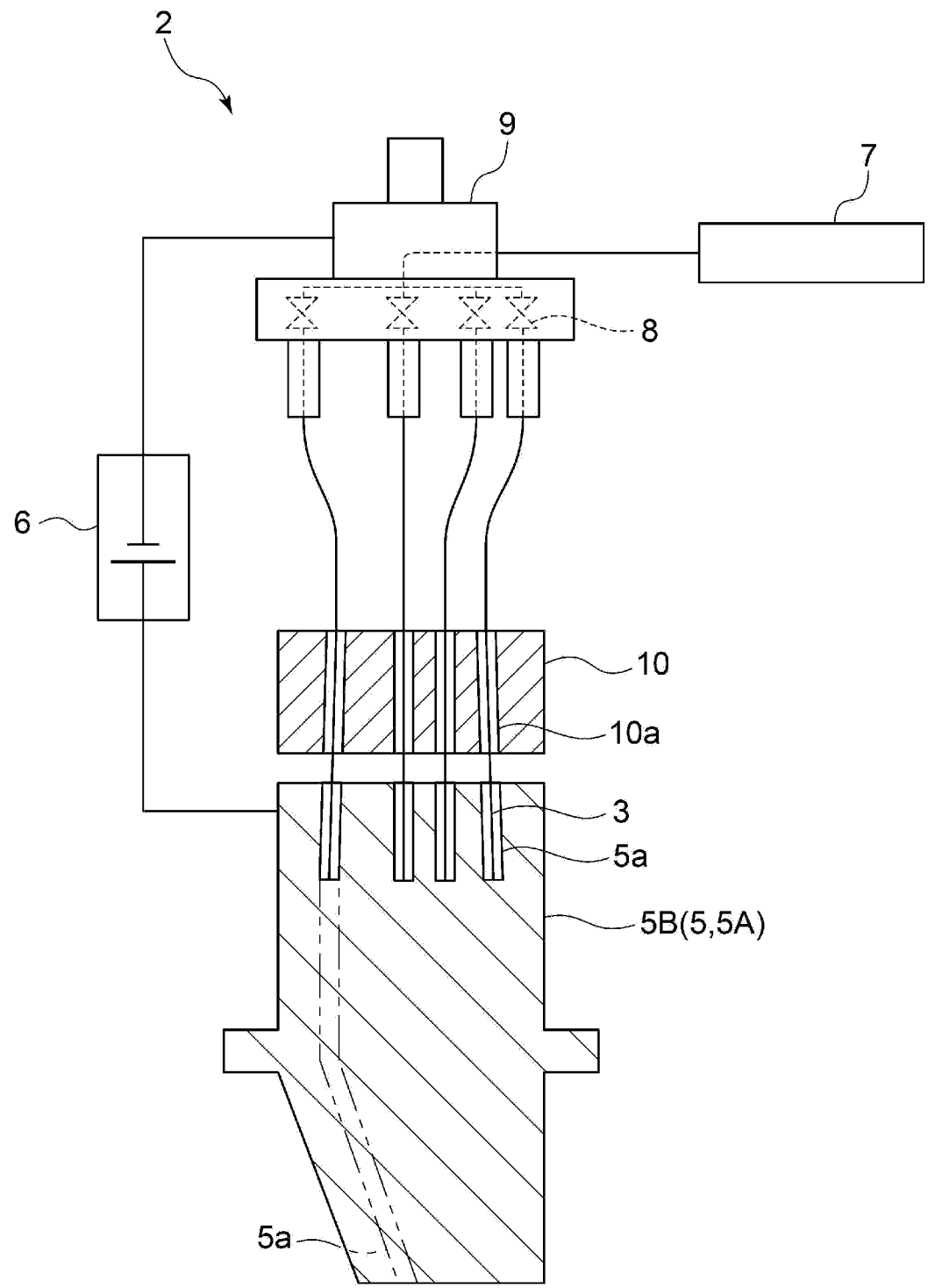
FIG. 3 is a schematic view for describing the electromechanical machining method and showing an example of an electromechanical machining system according to an embodiment.

FIG. 1 is a vertical cross-sectional view schematically showing a processing electrode together with a workpiece according to an embodiment of the present invention. FIG. 2 is a flowchart for describing an electromechanical machining method according to an embodiment of the present invention. FIG. 3 is a schematic view for describing the electromechanical machining method and showing an example of an electromechanical machining system according to an embodiment. An electromechanical machining method 1 shown in FIG. 2 and a method of manufacturing a perforated material will be described below together with descriptions of a processing electrode 3 and an electromechanical machining system 2 shown in FIGS. 1 and 3.

As shown in FIG. 1, the electromechanical machining method 1 according to some embodiments is an electromechanical machining method of forming a curved-shaped processing hole $5a$ in a workpiece 5 by electromechanical machining. As shown in FIG. 2, the electromechanical machining method 1 includes steps S101, S102, and S103. Step S101 is a step of feeding an electrolytic solution W through an inner channel $3b$ of the processing electrode 3 and jetting the electrolytic solution W from an outlet opening $3d$ of the inner channel $3b$ disposed on a tip surface $3c$ of the processing electrode 3. Step S102 is a step of applying a potential difference between the processing electrode 3 and the workpiece 5 while jetting the electrolytic solution W from the outlet opening 3*d* of the processing electrode 3. Step S103 is a step of forming the curved-shaped processing hole 5*a* in the workpiece 5.

In above-described step S101, the electrolytic solution W is supplied to the inner channel 3*b* of the processing electrode 3 by an electrolytic solution supply device 7 shown in FIG. 3, is fed through the inner channel 3*b* of the processing electrode 3, and is jetted from the outlet opening 3*d* of the inner channel 3*b* disposed on the tip surface 3*c* of the processing electrode 3.

In above-described step S102, the potential difference is applied between the processing electrode 3 and the workpiece 5 in the electrolytic solution W by a power source 6 shown in FIG. 3 while jetting the electrolytic solution W from the outlet opening 3*d* of the processing electrode 3. In the embodiment shown in FIG. 3, a voltage is applied between the processing electrode 3 and the workpiece 5 in the electrolytic solution W to pass a current, and the workpiece 5 is eluted into the electrolytic solution W by electrochemical reaction. The processing electrode 3 is applied with a negative voltage, and the workpiece 5 is applied with a positive voltage.

In above-described step S103, as will be described later, at least one of a current density distribution on the tip surface 3*c* or a flow velocity distribution of the electrolytic solution W is eccentric with respect to an axial center Cs of the tip surface 3*c* of the processing electrode 3, thereby forming the curved-shaped processing hole 5*a* in the workpiece 5. In step S103, in order to form the curved-shaped processing hole 5*a*, an electrode feeding device 9 shown in FIG. 3 feeds the processing electrode 3 into the processing hole 5*a* of the workpiece 5. In a case in which the processing hole 5*a* is formed into the curved shape, the electrode feeding device 9 feeds the processing electrode 3 into the processing hole 5*a* while restricting the rotation of the processing electrode 3 so the processing electrode 3 does not rotate about the axis. In a case in which the processing hole 5*a* is formed linearly, the electrode feeding device 9 feeds the processing electrode 3 into the processing hole 5*a* while rotating the processing electrode 3.

The processing electrode 3 and the electromechanical machining system 2 including the processing electrode 3 will be described below, both of which can be used to execute the above-described electromechanical machining method 1.

As shown in FIGS. 1 and 3, the electromechanical machining system 2 includes the processing electrode 3 and can form at least one curved-shaped processing hole 5*a* (curved hole) in the workpiece 5 by the processing electrode 3. The electromechanical machining system 2 can also manufacture a perforated material 5A which is manufactured by forming the curved-shaped processing hole 5*a* in the workpiece 5 by the processing electrode 3.

As shown in FIG. 3, the electromechanical machining system 2 includes the power source 6, the electrolytic solution supply device 7, an electrolytic solution supply amount adjustment device 8, the electrode feeding device 9, and an electrode guide material 10, in addition to the above-described processing electrode 3. The power source 6 includes, for example, a DC generator, and can apply the potential difference between the processing electrode 3 and the workpiece 5. The power source 6 may pass not a direct current but a pulse current. The electrolytic solution supply device 7 includes, for example, a pump or a dispenser and can supply the electrolytic solution W (processing solution) to the processing electrode 3. In FIG. 1, and FIGS. 5, 7, 8, 10, 12, and 14 to be described later, flowing directions of the electrolytic solution W are indicated by arrows. The electrolytic solution supply amount adjustment device 8 includes, for example, a valve with an adjustable opening degree or a valve of which opening/closing is controllable and can adjust the flow rate (supply amount) of the electrolytic solution supplied from the electrolytic solution supply device 7 to the processing electrode 3.

With the object of improving efficiency of electromechanical machining, the electrolytic solution W may contain nitric acid or sodium nitrate.

The electrode feeding device 9 can adjust an axial relative position of the processing electrode 3 with respect to the workpiece 5 (the processing hole 5*a*, in particular). The electrode feeding device 9 includes, for example, an actuator and can adjust the feed amount of the processing electrode 3 to the workpiece 5 while holding a base-end side of the processing electrode 3. As shown in FIG. 3, the electrode guide material 10 has a through hole 10*a* and passes the processing electrode 3 through the through hole 10*a*, thereby guiding the processing electrode 3 to a forming position of the processing hole 5*a* of the workpiece 5.

As shown in FIG. 1, the processing electrode 3 (3A to 3G) includes a hollow electrode portion 3*a* of a tubular shape such as a cylindrical shape and extends along an axis Le. In the following description, reference numeral before a parenthesis may be used in a case in which reference characters in parentheses are collectively referred. Moreover, the processing electrode 3 may have, for example, a square tubular shape or the like.

The processing electrode 3 is made of, for example, a flexible conductive material such as stainless steel, copper, or titanium. The processing electrode 3 has an outer diameter of, for example, not less than 1 mm and not more than 10 mm. As shown in FIG. 1, an outer peripheral surface of the hollow electrode portion 3*a* of the processing electrode 3 is entirely covered with an electrical insulation layer 4 in the axial direction. The electrical insulation layer 4 is made from, for example, a resin (such as a polyester resin) having an electrical insulating property. The electrical insulation layer 4 does not cover the tip surface 3*c* of the processing electrode 3, and thus the tip surface 3*c* is exposed. The base-end side of the processing electrode 3 can be connected to the power source 6, and the workpiece 5 can also be connected to the power source 6.

As shown in FIG. 1, at least one inner channel 3*b* extending along the axis Le of the processing electrode 3 is formed in the processing electrode 3. The inner channel 3*b* can feed the electrolytic solution W from the base-end side toward the tip side of the processing electrode 3 and, as shown in FIG. 3, can be connected to the electrolytic solution supply device 7 on the base-end side of the processing electrode 3. As shown in FIG. 3, the electrolytic solution supply amount adjustment device 8 is disposed between the electrolytic solution supply device 7 and the inner channel 3*b* of the processing electrode 3. As described above, the electrolytic solution supply amount adjustment device 8 can adjust the supply amount of the electrolytic solution W from the electrolytic solution supply device 7 to the inner channel 3*b* of each processing electrode 3.

As shown in FIG. 1, at least one outlet opening 3*d* of the inner channel 3*b* for jetting the electrolytic solution W is formed on the tip surface 3*c* positioned on the tip side of the processing electrode 3. As shown in FIG. 1, the electrolytic solution W jetted from the outlet opening 3*d* is discharged outside from the opening of the processing hole 5a after passing through between the tip surface 3c of the processing electrode 3 and an inner surface 5b of the processing hole 5a of the workpiece 5, and between the outer periphery of the electrical insulation layer 4 and the inner surface 5b of the processing hole 5a. The processing electrode 3 is supported so as not to contact the inner surface 5b of the processing hole 5a due to a solution pressure of the electrolytic solution W.

As described above, the electromechanical machining method 1 according to some embodiments includes steps S101, S102, and S103 described above.

As a result of intensive researches by the present inventors, it becomes clear that the curved-shaped processing hole 5a can be formed by making at least one of the current density distribution on the tip surface 3c or the flow velocity distribution of the electrolytic solution W eccentric with respect to the axial center Cs of the tip surface 3c of the processing electrode 3.

More detailed descriptions will be given below. As shown in FIG. 1, a direction opposite to a curving direction of the processing hole 5a is defined as an upstream side of the curving direction (the left side of an axis Ls in the view), and the curving direction of the processing hole 5a is defined as a downstream side of the curving direction (the right side of the axis Ls in the view). If the current density distribution on the tip surface 3c is eccentric to the downstream side of the curving direction of the processing hole 5a with respect to the axial center Cs of the tip surface 3c, a current flowing between the tip surface 3c on the downstream side of the curving direction and an inner surface 5c (5b) of the processing hole 5a is larger than a current flowing between the tip surface 3c on the upstream side of the curving direction and an inner surface 5d (5b) of the processing hole 5a. Consequently, the processing amount of the inner surface 5b of the processing hole 5a increases accordingly. Thus, as indicated by a processing line Lm in each of FIGS. 5, 7, 8, and 10, the workpiece 5 is processed more deeply on the inner surface 5c positioned on the downstream side of the curving direction than on the inner surface 5d positioned on the upstream side of the curving direction. Therefore, it is possible to form the curved-shaped processing hole 5a by making the current density distribution on the tip surface 3c eccentric with respect to the axial center Cs of the tip surface 3c.

If the flow velocity distribution of the electrolytic solution W jetted from the outlet opening 3d is eccentric to the downstream side of the curving direction of the processing hole 5a with respect to the axial center Cs of the tip surface 3c, a flow rate of the electrolytic solution W flowing between the tip surface 3c on the downstream side of the curving direction and the inner surface 5c of the processing hole 5a is higher than a flow rate of the electrolytic solution W flowing between the tip surface 3c on the upstream side of the curving direction and the inner surface 5d of the processing hole 5a. Consequently, ion exchange is performed accordingly by electromechanical machining, making it possible to discharge the electrolytic solution W where ions eluted from the inner surface 5c of the processing hole 5a are inherent and to improve an electromechanical machining speed. Thus, as indicated by the processing line Lm in each of FIGS. 12 and 14, the workpiece 5 is processed more deeply on the inner surface 5c positioned on the downstream side of the curving direction where electromechanical machining efficiency does not decrease than on the inner surface 5d positioned on the upstream side of the curving direction. Therefore, it is possible to form the curved-shaped processing hole 5a by making the current density distribution of the electrolytic solution W on the tip surface 3c eccentric with respect to the axial center Cs of the tip surface 3c.

Thus, in some embodiments, in step S101 of jetting the electrolytic solution W, at least one of the current density distribution on the tip surface 3c of the processing electrode 3 or the flow velocity distribution of the electrolytic solution W jetted from the outlet opening 3d is eccentric to the downstream side of the curving direction of the processing hole 5a (the right side of the axis Ls which passes through the axial center Cs of the tip surface 3c of the processing electrode 3 and is perpendicular to the tip surface 3c in FIG. 1) with respect to the axial center Cs, as will be described later with reference to FIGS. 4 to 15.

Thus, based on the principle described above, the processing hole 5a curves toward the eccentric direction of the current density distribution or the flow velocity distribution without providing, for example, a fluid lead-out portion or the like for the processing electrode 3. Since the workpiece 5 is processed more deeply on the inner surface 5c positioned on the downstream side of the curving direction than on the inner surface 5d positioned on the upstream side of the curving direction, an interval between the inner surface 5c and the tip surface 3c of the processing electrode 3 increases, and the solution pressure of the electrolytic solution W flowing through the interval decreases. The processing electrode 3 is prompted such that the tip part thereof is curved, due to the solution pressure of the electrolytic solution W flowing around, to the above-described side where the solution pressure of the electrolytic solution W decreases, and processes the workpiece 5 in the above-described eccentric direction. Therefore, according to the above-described method, it is possible to easily form the curved hole (processing hole 5a) while avoiding complicating the configuration of the electrode (processing electrode 3).

Hereinafter, a method of forming the curved hole by making the current density distribution on the tip surface 3c eccentric (see FIGS. 4 to 10) and a method of forming the curved hole by making the flow velocity distribution of the electrolytic solution W on the tip surface 3c (see FIGS. 11 to 14) will be described in detail in this order.

Figure 4:
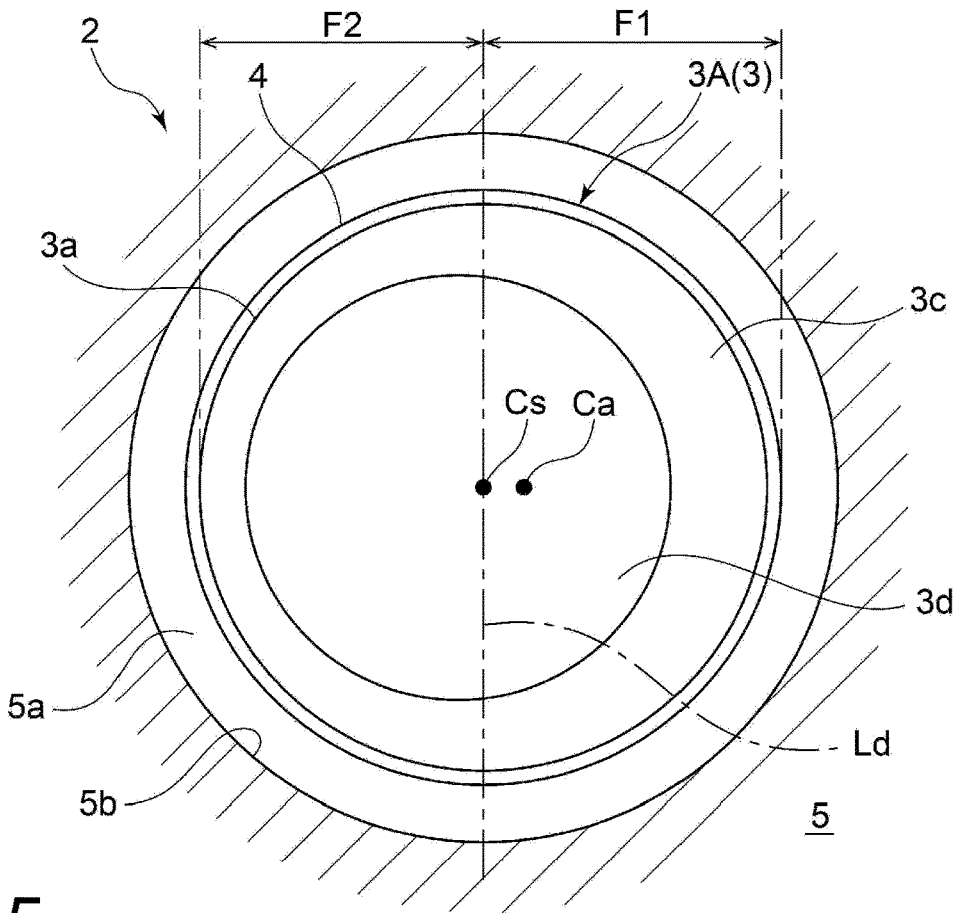
FIG. 4 is a schematic cross-sectional view taken along line A-A shown in FIG. 1 and showing the configuration of a tip surface of a processing electrode according to an embodiment.
Figure 5:
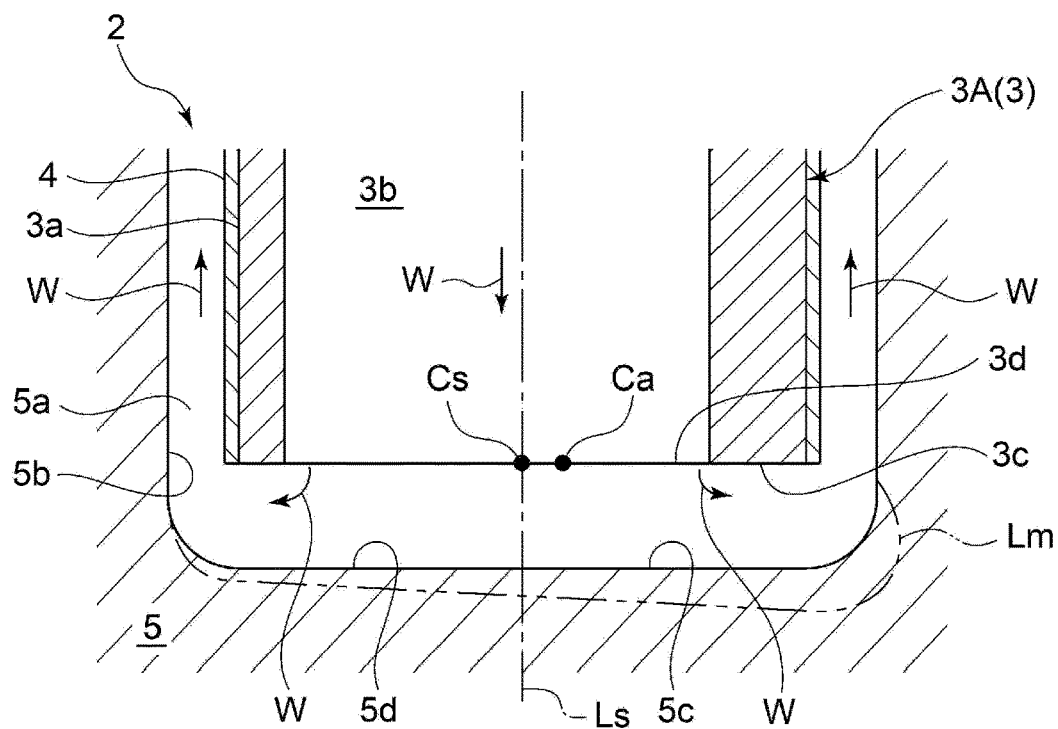
FIG. 5 is a view showing a state in which a processing hole is formed by using the processing electrode shown in FIG. 4.

(Method of forming curved hole by eccentric current density distribution) FIG. 4 is a schematic cross-sectional view taken along line A-A shown in FIG. 1 and showing the configuration of the tip surface of the processing electrode 3 according to an embodiment. FIG. 5 is a view showing a state in which the processing hole 5a is formed by using the processing electrode 3 shown in FIG. 4.

Figure 6:
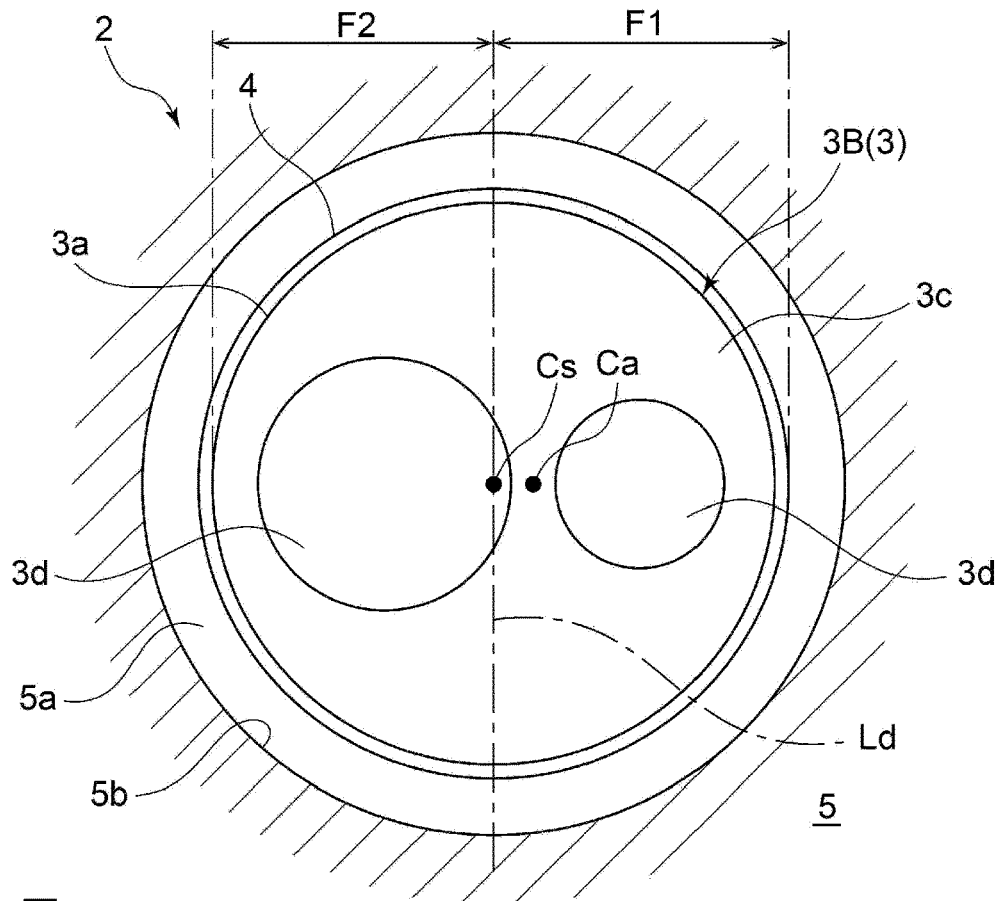
FIG. 6 is a schematic cross-sectional view taken along line A-A shown in FIG. 1 and showing the configuration of the tip surface of a processing electrode according to an embodiment.
Figure 7:
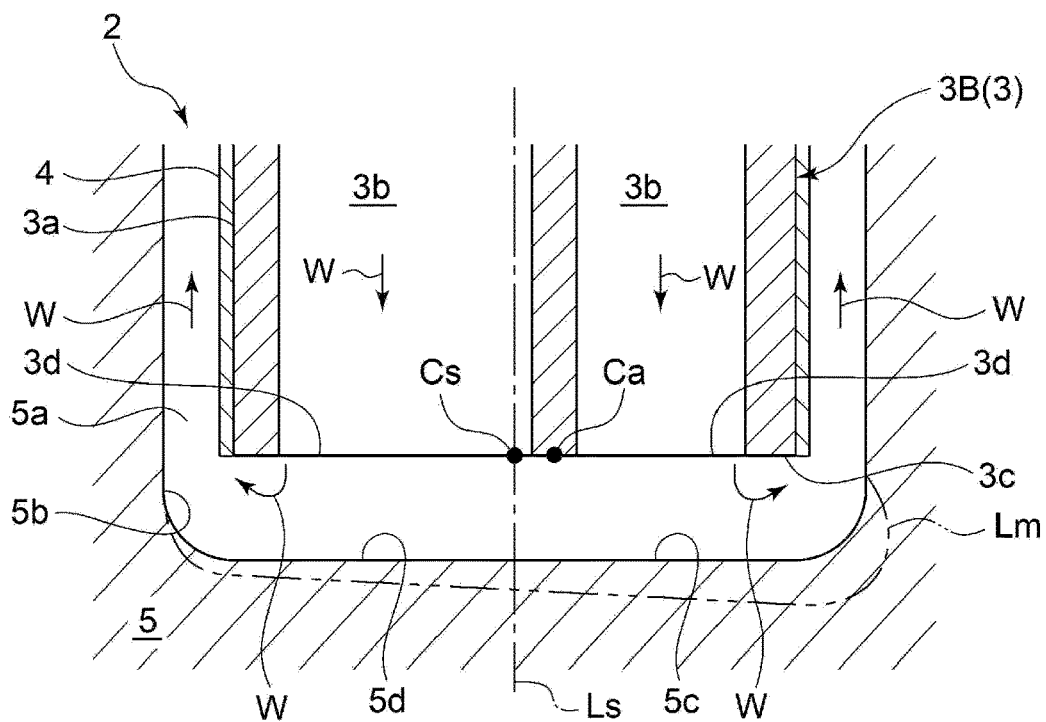
FIG. 7 is a view showing a state in which the processing hole is formed by using the processing electrode shown in FIG. 6.
Figure 8:
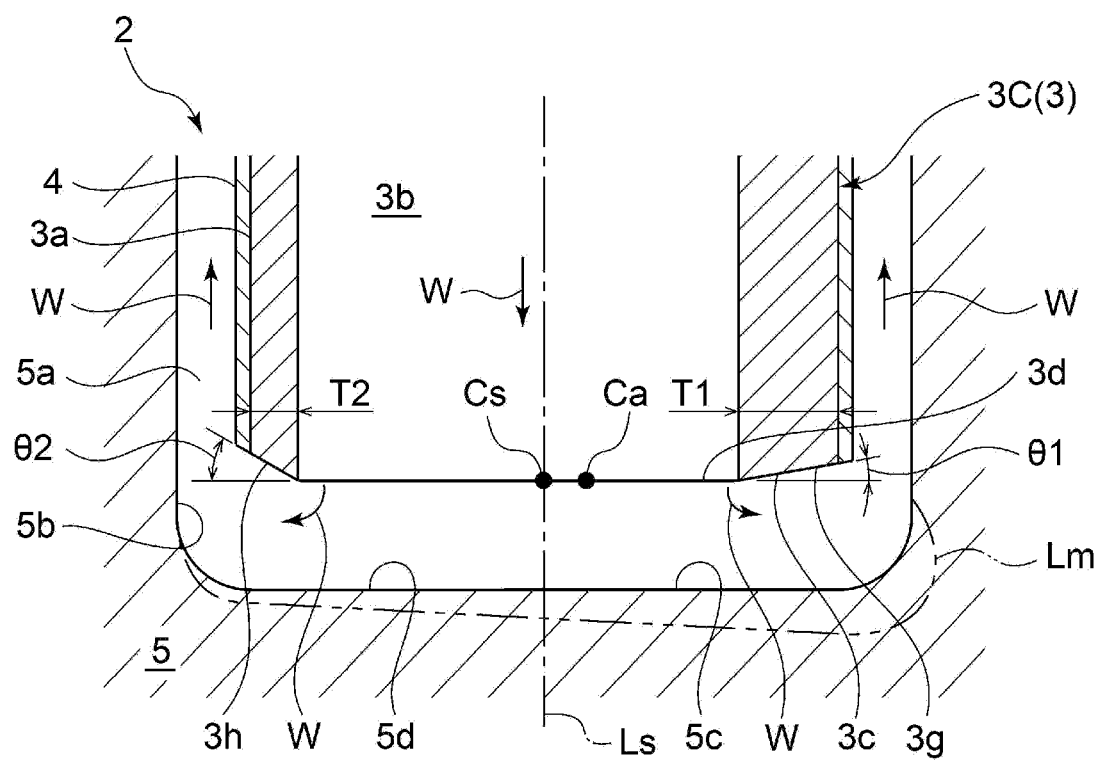
FIG. 8 is a view showing a state in which the processing hole is formed by using a processing electrode with tapered surfaces being formed at a tip thereof.
Figure 9:
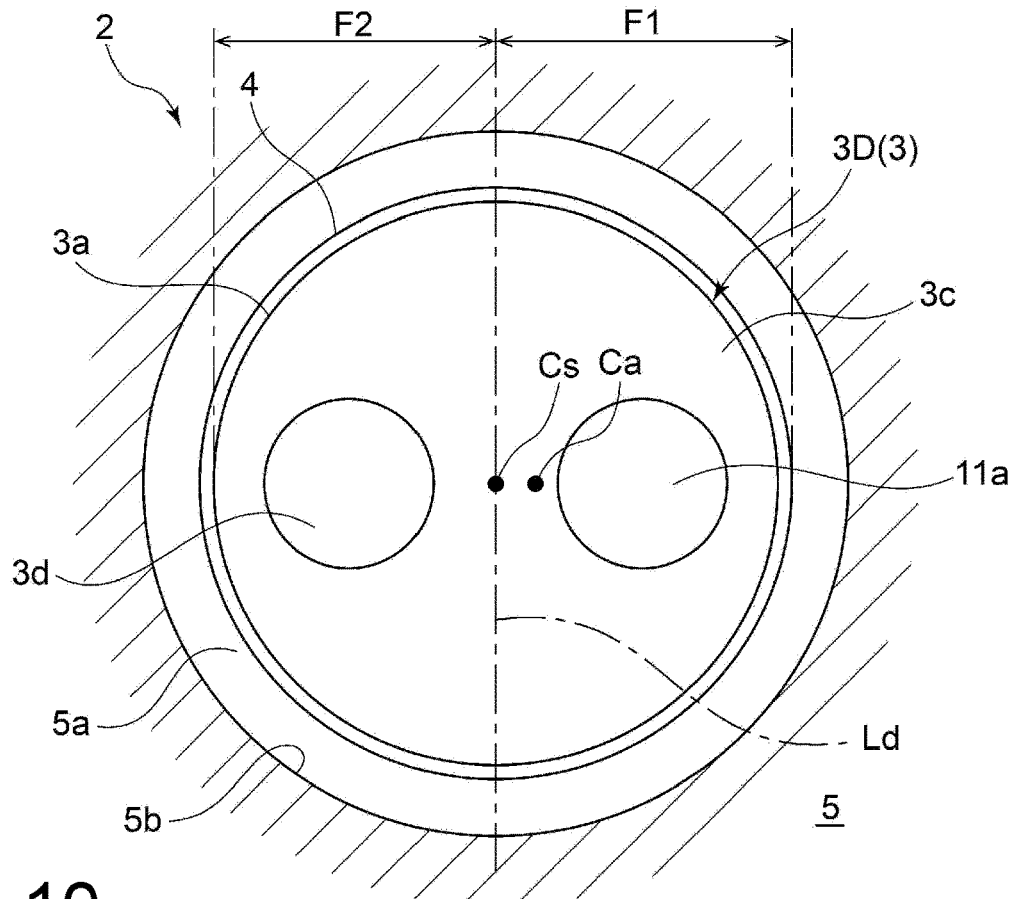
FIG. 9 is a schematic cross-sectional view taken along line A-A shown in FIG. 1 and showing the configuration of the tip surface of a processing electrode according to an embodiment.
Figure 10:
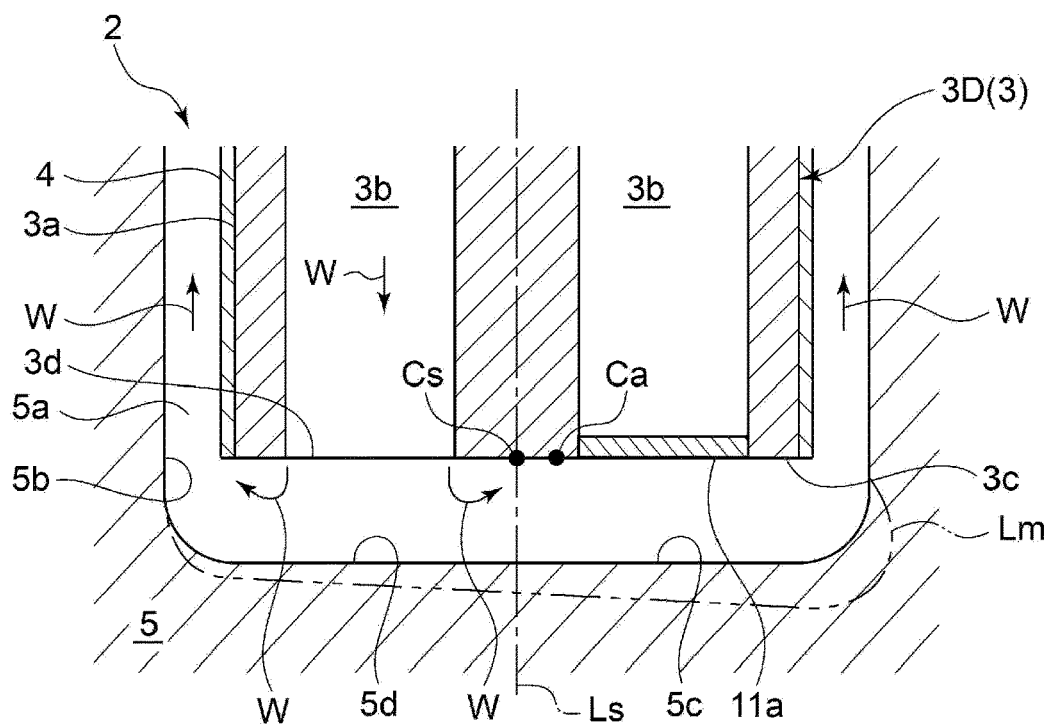
FIG. 10 is a view showing a state in which the processing hole is formed by using the processing electrode shown in FIG. 9.

Similarly to FIG. 4, each of FIGS. 6 and 9 shows the configuration of the tip surface of the processing electrode 3 according to an embodiment. FIGS. 7 and 10 are views respectively showing states shown in FIGS. 6 and 9 each in which the processing hole 5a is formed by using the processing electrode 3. FIG. 8 is a view showing a state in which the processing hole 5a is formed by using the processing electrode 3 with tapered surfaces 3g, 3h being formed at a tip thereof.

In some embodiments, as shown in FIGS. 4 to 10, a centroid Ca of a region of the tip surface 3c excluding the outlet opening 3d is eccentric with respect to the axial center Cs of the current density distribution on the tip surface 3c by using the processing electrode 3 (3A to 3D) which is eccentric with respect to the axial center Cs of the tip surface 3c. In this case, the processing hole 5a is formed with a curve in a direction in which the centroid Ca of the region deviates with respect to the axial center Cs.

In the embodiments shown in FIGS. 4 and 5, in the processing electrode 3A, the one inner channel 3b is formed radially inside of the hollow electrode portion 3a, and the one outlet opening 3d communicating with the inner channel 3b is formed on the tip surface 3c. In the processing electrode 3A, as shown in FIG. 4, the outlet opening 3d is arranged to be eccentric to the left side in the view with respect to the axial center Cs of the tip surface 3c. Thus, as shown in FIG. 4, the centroid Ca of the region of the tip surface 3c excluding the outlet opening 3d is eccentric to the right side in the view with respect to the axial center Cs of the tip surface 3c.

In the embodiments shown in FIGS. 6 and 7, in the processing electrode 3B, two inner channels 3b are formed radially inside of the hollow electrode portion 3a, and two outlet openings 3d communicating with the respective inner channels 3b are formed on the tip surface 3c. As shown in FIG. 6, the outlet opening 3d positioned on the right side in the view is formed to have a smaller diameter than the outlet opening 3d positioned on the left side in the view. Thus, as shown in FIG. 6, the centroid Ca of the region of the tip surface 3c excluding the outlet opening 3d is eccentric to the right side in the view with respect to the axial center Cs of the tip surface 3c.

In the embodiment shown in FIG. 8, the processing electrode 3C has the same configuration as the processing electrode 3A, in which the tapered surfaces 3g, 3h are formed at a tip thereof in a vertical cross-sectional view. The tapered surfaces 3g, 3h each have an external dimension gradually decreasing toward the tip. In this case, since the tapered surfaces 3g, 3h are formed, the electrolytic solution W flowing in the vicinity of the tip surface 3c of the processing electrode 3C easily flows into between the outer periphery of the electrical insulation layer 4 and the inner surface 5b of the processing hole 5a. Thus, it is possible to prevent a decrease in efficiency of electromechanical machining. The tapered surfaces 3g, 3h are also applicable to the other processing electrode 3 (3B, 3D to 3G).

As shown in FIG. 8, provided that inclination angles between a surface perpendicular to the axis Ls of the tip surface 3c and the tapered surfaces 3g, 3h of the processing electrode 3C are respectively θ1 and θ2, the inclination angle θ1 on a thick side (the right side in the view) is formed to be smaller than the inclination angle θ2 on a thin side. The hollow electrode portion 3a has a thickness T1 on the thick side and has a thickness T2 which is smaller than the thickness T1 on the thin side. It is possible to pass the larger amount of the electrolytic solution W between the outer periphery of the electrical insulation layer 4 and the inner surface 5b of the processing hole 5a in a case in which the tapered surface has the large inclination angle than in a case in which the tapered surface has the small inclination angle. In addition, intervals between the tapered surface and the inner surfaces 5c, 5d of the workpiece 5 decrease entirely in the case in which the tapered surface has the small inclination angle as compared with the case in which the tapered surface has the large inclination angle. Thus, a current density on the tapered surface has a large effect on the inner surfaces 5c, 5d of the workpiece 5, making it possible to deeply process the inner surfaces 5c, 5d of the workpiece 5. In the embodiment shown in FIG. 8, the tapered surfaces 3g, 3h are formed over the entire tip surface 3c. However, the tapered surfaces 3g, 3h may be formed at least partially in the circumferential direction. The tapered surface 3g is formed only on the downstream side of the curving direction in the circumferential direction, allowing the flow velocity distribution of the electrolytic solution W to be eccentric to the downstream side of the curving direction.

In the embodiments shown in FIGS. 9 and 10, in the processing electrode 3D, the two inner channels 3b are formed radially inside of the hollow electrode portion 3a. However, the one inner channel 3b (the inner channel 3b on the right side in the views) is clogged with a conductive material 11a and does not have the outlet opening. That is, only the inner channel 3b on the left side in the views of the two inner channels 3b has the outlet opening 3d. Thus, the centroid Ca of the region of the tip surface 3c excluding the outlet opening 3d is eccentric with respect to the axial center Cs of the tip surface 3c. One of the two inner channels 3b having different diameters as shown in FIGS. 6 and 7 may be clogged.

According to the above-described method, a current flows through the conductive material 11a by partially clogging the inner channel 3b with the conductive material 11a on the tip surface 3c even if the centroid Ca of the region excluding the outlet opening 3d is not eccentric with respect to the axial center Cs before the inner channel 3b is partially clogged. Thus, it is possible to make the centroid Ca of the region eccentric with respect to the axial center Cs. Therefore, it is possible to make the current density distribution of the processing electrode 3C eccentric in the direction in which the centroid Ca of the region deviates with respect to the axial center Cs, and thus to form the processing hole 5a with a curve in the direction in which the centroid Ca of the region deviates.

As shown in FIGS. 4, 6, and 9, the tip surface 3c of the processing electrode 3 is divided by a reference line Ld into two, namely, a first region F1 on the downstream side of the curving direction of the processing hole 5a and a second region F2 on the upstream side of the curving direction. The reference line Ld is a straight line which passes through the axial center Cs, and is perpendicular to a straight line passing through the centroid Ca and the axial center Cs on the tip surface 3c.

As shown in FIGS. 4, 6, and 9, a conductive area on the tip surface 3c is larger on the side of the first region F1 than on the side of the second region F2, and a current flows more easily on the side of the first region F1 than on the side of the second region F2. On the side of the first region F1, the centroid Ca of the region of the tip surface 3c excluding the outlet opening 3d is eccentric with respect to the axial center Cs of the tip surface 3c. Thus, in the embodiments shown in FIGS. 1 and 4 to 10 described above, a current density distribution is formed in which the average of current densities on the side of the first region F1 is larger than the average of current densities on the side of the second region F2 of the tip surface 3c of the processing electrode 3 (3A to 3D).

(Method of Forming Curved Hole by Eccentric Flow Velocity Distribution)

Figure 11:
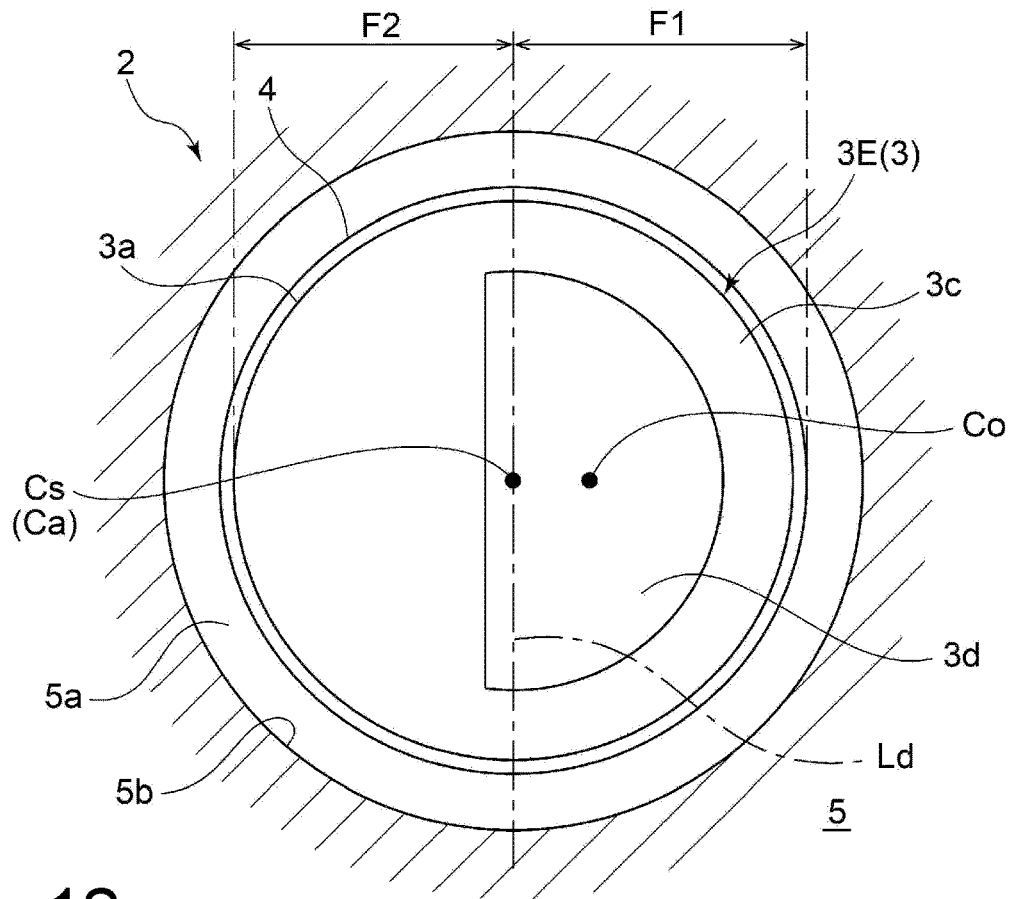
FIG. 11 is a schematic cross-sectional view taken along line A-A shown in FIG. 1 and showing the configuration of the tip surface of a processing electrode according to an embodiment.
Figure 12:
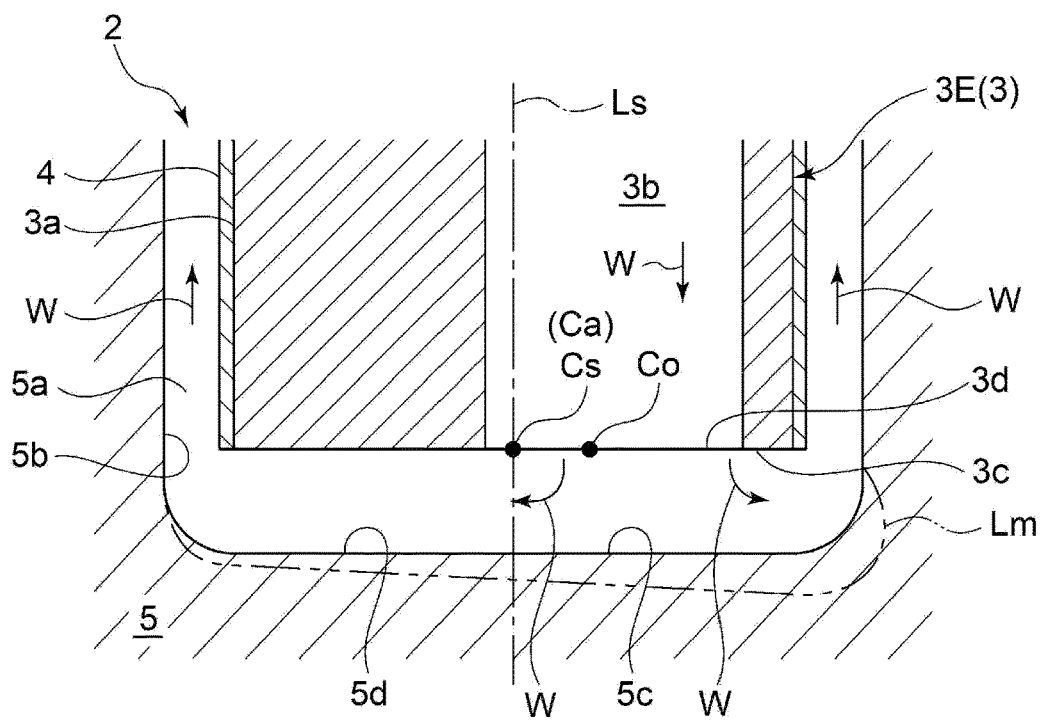
FIG. 12 is a view showing a state in which the processing hole is formed by using the processing electrode shown in FIG. 11.

FIG. 11 is a schematic cross-sectional view taken along line A-A shown in FIG. 1 and showing the configuration of the tip surface of the processing electrode 3 according to an embodiment. FIG. 12 is a view showing a state in which the processing hole 5a is formed by using the processing electrode 3 shown in FIG. 11.

Figure 13:
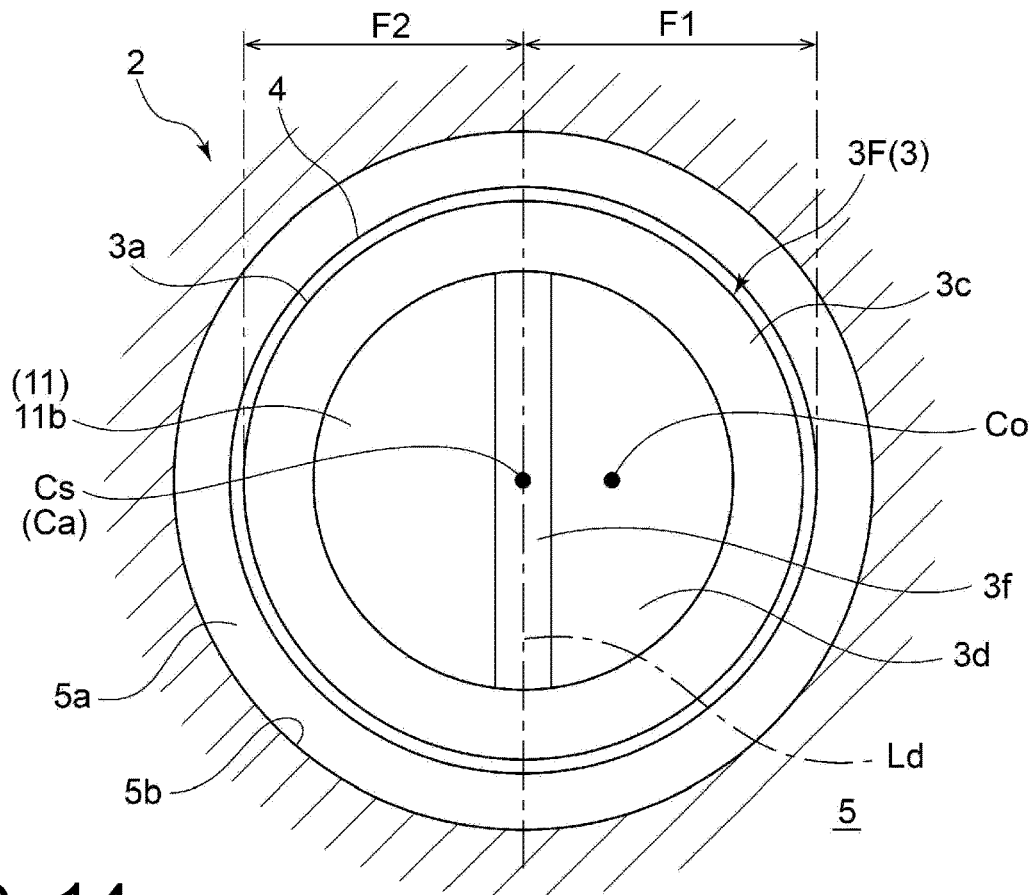
FIG. 13 is a schematic cross-sectional view taken along line A-A shown in FIG. 1 and showing the configuration of the tip surface of a processing electrode according to an embodiment.
Figure 14:
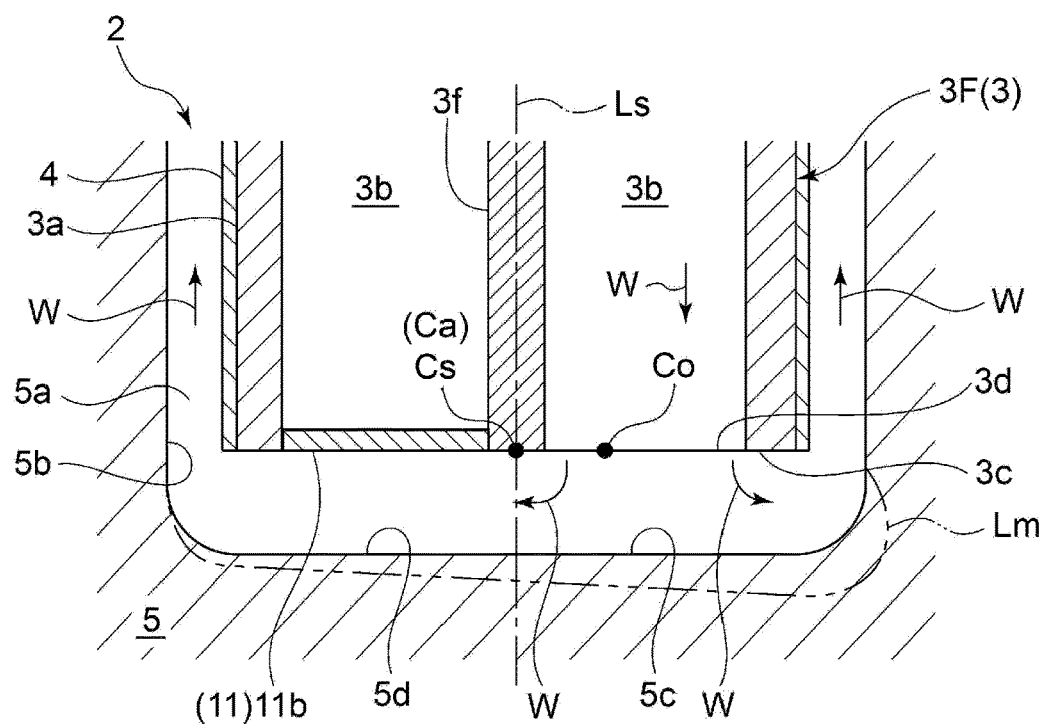
FIG. 14 is a view showing a state in which the processing hole is formed by using the processing electrode shown in FIG. 13.

Similarly to FIG. 11, FIG. 13 shows the configuration of the tip surface of the processing electrode 3 according to an embodiment. FIG. 14 is a view showing a state in which the processing hole 5a is formed by using the processing electrode 3 shown in FIG. 13.

In some embodiments, as shown in FIGS. 11 to 14, a centroid Co of the outlet opening 3d is eccentric with respect to the axial center Cs of the flow velocity distribution of the electrolytic solution W on the tip surface 3c by using the processing electrode 3 (3E, 3F) which is eccentric with respect to the axial center Cs of the tip surface 3c. In this case, the processing hole 5a is formed with a curve in a direction in which the centroid Co of the outlet opening 3d deviates with respect to the axial center Cs.

As shown in FIGS. 11 and 12, in the processing electrode 3E, the one inner channel 3b is formed radially inside of the hollow electrode portion 3a, and the one outlet opening 3d communicating with the inner channel 3b is formed on the tip surface 3c. The outlet opening 3d of the processing electrode 3E has a substantially semi-circular shape, and the centroid Co of the outlet opening 3d on the tip surface 3c is eccentric to the right side in the view with respect to the axial center Cs of the tip surface 3c.

As shown in FIG. 11, on the side of the first region F1 where the centroid Co of the outlet opening 3d is eccentric with respect to the axial center Cs of the tip surface 3c, an opening area of the outlet opening 3d for jetting the electrolytic solution W on the tip surface 3c is larger than on the side of the second region F2, making it possible to jet the larger amount of the electrolytic solution W from the outlet opening 3d. Thus, in the embodiments shown in FIGS. 11 and 12 described above, a flow velocity distribution of the electrolytic solution W is formed in which, of the tip surface 3c of the processing electrode 3E, an average flow velocity of the electrolytic solution W in the first region F1 is higher than an average flow velocity of the electrolytic solution W in the second region F2.

In the embodiments shown in FIGS. 13 and 14, the processing electrode 3F includes a partition portion 3f connecting inner wall parts of the hollow electrode portion 3a and dividing the interior of the hollow electrode portion 3a into two. In the processing electrode 3F, the partition portion 3f forms the two inner channels 3b radially inside of the hollow electrode portion 3a. However, the one inner channel 3b (the inner channel 3b on the left side in the views) is clogged with a clogging material 11 on the tip surface 3c, and only the other inner channel 3b has the outlet opening 3d. Since one of the two inner channels 3b is thus clogged with the clogging material 11, the centroid Co of the outlet opening 3d of the tip surface 3c is eccentric with respect to the axial center Cs of the tip surface 3c. In the embodiments shown in FIGS. 13 and 14, the clogging material 11 is made of a non-conductive material 11b having a semicircular cross-sectional shape. The clogging material 11 may clog one of the two inner channels 3b having different diameters or may partially clog at least the one inner channel 3b.

According to the above-described method, it is possible to make the centroid Co of the outlet opening 3d eccentric with respect to the axial center Cs by partially clogging the inner channel 3b even if the centroid Co of the outlet opening 3d is not eccentric with respect to the axial center Cs before the inner channel 3b is partially clogged. Therefore, it is possible to make the flow velocity distribution of the electrolytic solution W jetted from the outlet opening 3d eccentric in the direction in which the centroid Co of the outlet opening 3d deviates with respect to the axial center Cs, and thus to form the processing hole 5a with a curve in the direction in which the centroid Co of the outlet opening 3d deviates.

The partition portion 3f may be configured to divide the interior of the hollow electrode portion 3a into three or more, and at least one of the inner channels 3b divided by the partition portion 3f may be clogged. The clogging material 11 clogging the inner channel 3b may be formed of the conductive material 11a. It is possible to easily make the current density distribution on the tip surface 3c and the flow velocity distribution of the electrolytic solution W eccentric to the downstream side of the curving direction of the processing hole 5a with respect to the axial center Cs of the tip surface 3c of the processing electrode 3 by clogging at least one of the plurality of inner channels 3b divided by the partition portion 3f.

In the embodiments shown in FIGS. 13 and 14, the flow velocity distribution of the electrolytic solution W on the tip surface 3c is eccentric with respect to the axial center Cs by partially clogging the inner channel 3b with the clogging material 11 disposed on the tip surface 3c. However, the clogging material 11 may be disposed in the middle of the inner channel 3b.

Figure 15:
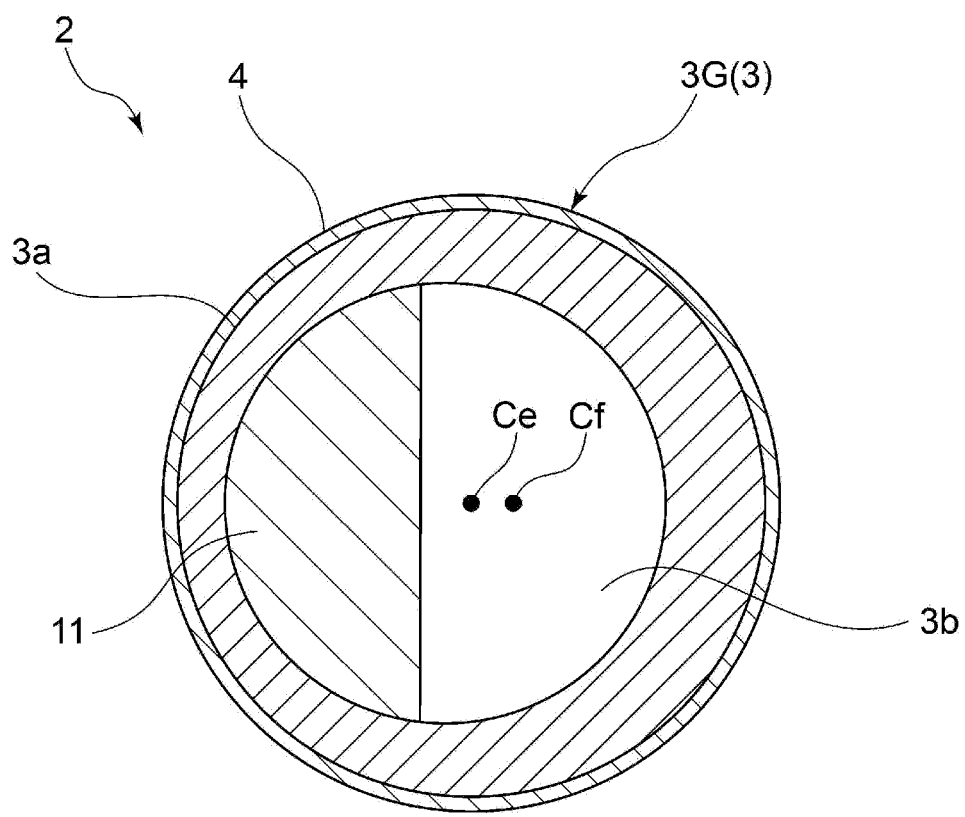
FIG. 15 is a schematic cross-sectional view taken along line B-B shown in FIG. 1 and showing a processing electrode according to an embodiment.

FIG. 15 is a cross-sectional view of the processing electrode 3G according to an embodiment. As shown in FIG. 15, a centroid Cf of the inner channel 3b is eccentric with respect to an axial center Ce of the processing electrode 3G in a cross section orthogonal to the axial direction of the processing electrode 3G. The shape of the inner channel 3b may be different from the shape of the outlet opening 3d in the cross section orthogonal to the axial direction of the processing electrode 3G so that the centroid Cf of the inner channel 3b is eccentric with respect to the axial center Ce of the processing electrode 3G.

According to the above-described method, since the centroid Cf of the inner channel 3b is eccentric with respect to the axial center Ce of the processing electrode 3F in the cross section orthogonal to the axial direction of the processing electrode 3G, the flow velocity distribution of the electrolytic solution W on the tip surface 3c is eccentric in a direction in which the centroid Cf of the inner channel 3b deviates with respect to the axial center Ce. Thus, it is possible to form the processing hole 5a with a curve in the direction in which the centroid Cf of the inner channel 3b deviates.

In some embodiments described above, the flow velocity distribution of the electrolytic solution W on the tip surface 3c is eccentric with respect to the axial center Cs by making the centroid Cf of the inner channel 3b eccentric with respect to the axial center Ce of the processing electrode 3F in the cross section orthogonal to the axial direction of the processing electrode 3G. However, in a case in which the plurality of inner channels 3b are formed in the processing electrode 3, the flow velocity distribution of the electrolytic solution W on the tip surface 3c may be eccentric with respect to the axial center Cs by making flow velocities of the electrolytic solution W passing through the respective inner channels 3b different from each other.

In some embodiments, the above-described electrolytic solution supply amount adjustment device 8 of the above-described electromechanical machining system 2 is configured to be able to adjust the supply amount of the electrolytic solution W to each of the plurality of inner channels 3b formed in the one processing electrode 3. In this case, since the flow velocity distribution of the electrolytic solution W jetted from the outlet opening 3d is eccentric along with an eccentricity of the flow velocity distribution of the electrolytic solution W passing through the inner channel 3b by the electrolytic solution supply amount adjustment device 8, it is possible to form the processing hole 5a with a curve in a direction in which the flow velocity distribution of the electrolytic solution W passing through the inner channel 3b is eccentric.

A method of manufacturing the perforated material 5A according to some embodiments includes a step of forming the processing hole 5a in the workpiece 5 by the above-described electromechanical machining method 1 according to some embodiments and manufacturing the perforated material 5A. That is, the method of manufacturing the perforated material 5A includes steps S101, S102, and S103 described above. In this case, since it is possible to easily form the curved hole (processing hole 5a) while avoiding complicating the configuration of the electrode (processing electrode 3) by the above-described electromechanical machining method 1, it is possible to easily manufacture the perforated material 5A having the processing hole 5a.

As shown in FIG. 3, the perforated material 5A may be a gas turbine rotor blade 5B having a curved-shaped cooling hole as the processing hole 5a. In the gas turbine rotor blade 5B, the processing hole 5a is used as a cooling hole where a refrigerant cooling the gas turbine rotor blade 5B feeds. In this case, it is possible to, for example, curve the curved shape of the processing hole 5a (cooling hole) along a geometrical shape of the gas turbine rotor blade 5B. Moreover, in the embodiment shown in FIG. 3, the processing hole 5a is a through hole penetrating from the lower end side (the upper side in the view) to the upper end side (the lower side in the view) of the gas turbine rotor blade 5B. However, the processing hole 5a may be an arbitrary through hole opening to a pressure surface, a suction surface, or a trailing edge part so as to bring an exterior and a cooling channel disposed inside of the gas turbine rotor blade 5B into communication, or may be a deep hole which does not penetrate.

The present invention is not limited to the above-described embodiment, and also includes an embodiment obtained by modifying the above-described embodiment and an embodiment obtained by combining these embodiments as appropriate.

REFERENCE SIGNS LIST

1 Electromechanical machining method
2 Electromechanical machining system
3, 3A to 3G Processing electrode
3a Hollow electrode portion
3b Inner channel
3c Tip surface
3d Outlet opening
3f Partition portion
3g, 3h Tapered surface
4 Electrical insulation layer
5 Workpiece
5A Perforated material
5B Gas turbine rotor blade
5a Processing hole
5b to 5d Inner surface
6 Power source
7 Electrolytic solution supply device
8 Electrolytic solution supply amount adjustment device
9 Electrode feeding device
10 Electrode guide material
11 Clogging material
11a Conductive material
11b Non-conductive material
Ca Centroid of region of tip surface excluding outlet opening
Ce Centroid of processing electrode
Cf Centroid of inner channel
Co Centroid of outlet opening
Cs Axial center of tip surface
F1 First region
F2 Second region
Ld Reference line
Le Axis of processing electrode
Lm Processing line
Ls Axis of tip surface
T1, T2 Thickness
W Electrolytic solution
θ1, θ2 Inclination angle

The invention claimed is:

1. An electromechanical machining method of forming a curved-shaped processing hole in a workpiece by electromechanical machining, comprising:
    a step of feeding an electrolytic solution through an inner channel of a processing electrode and jetting the electrolytic solution from an outlet opening of the inner channel disposed on a tip surface of the processing electrode;
    a step of applying a potential difference between the processing electrode and the workpiece while jetting the electrolytic solution from the outlet opening of the processing electrode; and
    a step of forming the curved-shaped processing hole in the workpiece,
    wherein, in the step of jetting the electrolytic solution, a flow velocity distribution of the electrolytic solution jetted from the outlet opening is eccentric to a downstream side of a curving direction of the processing hole with respect to an axial center of the tip surface of the processing electrode.

2. The electromechanical machining method claim 1,
    wherein a centroid of the outlet opening is eccentric with respect to the axial center of the tip surface, and
    wherein the processing hole is formed with a curve in a direction in which the centroid of the outlet opening deviates with respect to the axial center.

3. The electromechanical machining method according to claim 2, wherein the inner channel is partially clogged, and thus the centroid of the outlet opening is eccentric with respect to the axial center.

4. The electromechanical machining method according to claim 1, wherein a centroid of the inner channel is eccentric with respect to an axial center of the processing electrode in a cross section orthogonal to an axial direction of the processing electrode.

5. The electromechanical machining method according to claim 1, wherein, at a tip of the processing electrode, a tapered surface is formed at least partially in a circumferential direction, the tapered surface having an external dimension decreasing toward the tip.

6. The electromechanical machining method according to claim 1, wherein the electrolytic solution contains nitric acid or sodium nitrate.

7. A method of manufacturing a perforated material, comprising:
    a step of forming the processing hole in the workpiece by the method according to claim 1 and manufacturing the perforated material.

8. The method of manufacturing the perforated material according to claim 7, wherein the perforated material is a gas turbine rotor blade having a curved-shaped cooling hole as the processing hole.

9. An electromechanical machining method of forming a curved-shaped processing hole in a workpiece by electromechanical machining, the method comprising:
- a step of feeding an electrolytic solution through an inner channel of a processing electrode and jetting the electrolytic solution from an outlet opening of the inner channel disposed on a tip surface of the processing electrode;
- a step of applying a potential difference between the processing electrode and the workpiece while jetting the electrolytic solution from the outlet opening of the processing electrode; and
- a step of forming the curved-shaped processing hole in the workpiece,
- wherein, in the step of jetting the electrolytic solution, a current density distribution on the tip surface of the processing electrode is eccentric to a downstream side of a curving direction of the processing hole with respect to an axial center of the tip surface of the processing electrode,
- wherein a centroid of a region of the tip surface excluding the outlet opening is eccentric with respect to the axial center of the tip surface, and
- wherein the processing hole is formed with a curve in a direction in which the centroid of the region deviates with respect to the axial center.

10. The electromechanical machining method according to claim 9, wherein the inner channel is partially clogged with a conductive material on the tip surface, and thus the centroid of the region of the tip surface excluding the outlet opening is eccentric with respect to the axial center.

11. An electromechanical machining method of forming a curved-shaped processing hole in a workpiece by electromechanical machining, comprising:
- a step of feeding an electrolytic solution through an inner channel of a processing electrode and jetting the electrolytic solution from an outlet opening of the inner channel disposed on a tip surface of the processing electrode;
- a step of applying a potential difference between the processing electrode and the workpiece while jetting the electrolytic solution from the outlet opening of the processing electrode; and
- a step of forming the curved-shaped processing hole in the workpiece,
- wherein, in the step of jetting the electrolytic solution, at least one of a current density distribution on the tip surface of the processing electrode or a flow velocity distribution of the electrolytic solution jetted from the outlet opening is eccentric to a downstream side of a curving direction of the processing hole with respect to an axial center of the tip surface of the processing electrode, and
- wherein the inner channel is divided into a plurality of inner channels by a partition portion, and at least one of the plurality of divided inner channels is clogged.

12. A processing electrode for forming a curved-shaped processing hole in a workpiece by electromechanical machining, comprising:
- an inner channel configured to be able to feed an electrolytic solution in an axial direction of the processing electrode; and
- a tip surface where an outlet opening of the inner channel for jetting the electrolytic solution is formed,
- wherein a centroid of the outlet opening is eccentric to a downstream side of a curving direction of the processing hole with respect to an axial center of the tip surface.

13. An electromechanical machining system, comprising:
- at least the processing electrode according to claim 12,
- wherein the electromechanical machining system is configured to be able to form the processing hole in the workpiece by electromechanical machining using the processing electrode.

14. An electromechanical machining system comprising:
- at least a processing electrode for forming a curved-shaped processing hole in a workpiece by electromechanical machining,
- the processing electrode comprising an inner channel configured to be able to feed an electrolytic solution in an axial direction of the processing electrode, and a tip surface where an outlet opening of the inner channel for jetting the electrolytic solution is formed, wherein at least one of a centroid of a region of the tip surface excluding the outlet opening or a centroid of the outlet opening is eccentric with respect to an axial center of the tip surface,
- wherein the electromechanical machining system is configured to be able to form the processing hole in the workpiece by electromechanical machining using the processing electrode, and
- wherein the electromechanical machining system further comprises an electrolytic solution supply amount adjustment device configured to be able to adjust a supply amount of the electrolytic solution to each of a plurality of inner channels formed in the processing electrode.

* * * * *